US006862650B1

(12) United States Patent
Matthews et al.

(10) Patent No.: US 6,862,650 B1
(45) Date of Patent: Mar. 1, 2005

(54) DATA PROCESSING SYSTEM AND METHOD FOR MANAGING MEMORY OF AN INTERPRETIVE SYSTEM

(75) Inventors: Gareth Christopher Matthews, Cedar Park, TX (US); Kelvin Roderick Lawrence, Round Rock, TX (US)

(73) Assignee: International Business Machines Corporation, Armonk, NY (US)

(*) Notice: Subject to any disclaimer, the term of this patent is extended or adjusted under 35 U.S.C. 154(b) by 993 days.

(21) Appl. No.: 08/970,417

(22) Filed: Nov. 14, 1997

(51) Int. Cl.[7] .................................................. G06F 12/02

(52) U.S. Cl. ........................... 711/6; 711/170; 711/209; 717/148; 719/328; 718/1

(58) Field of Search ......................... 707/206; 395/705; 709/310–332

(56) References Cited

U.S. PATENT DOCUMENTS

| | | | | |
|---|---|---|---|---|
| 5,408,665 A | | 4/1995 | Fitzgerald | 395/700 |
| 5,848,423 A | * | 12/1998 | Ebrahim et al. | 707/206 |
| 6,081,665 A | * | 6/2000 | Nilsen et al. | 395/705 |
| 6,105,040 A | * | 8/2000 | Agesen | 707/206 |

OTHER PUBLICATIONS

Gosling et al, The Java language Environment : A White Paper; Oct. 1995.*

Lindholm et al, "Inside the Java virtual machine", UNIX Review v15, n1, p31(7) Jan. 1997.*

Lindholm et al, The Java Virtual Machine Specification, Sep. 1996.*

Singhal et al, "Building high–performance applications and servers in Java" Feb. 1997.*

Joseph WEber, "Special Edition Using Java, 2nd edition", chap. 39, 1996.*

Joseph Weber, Special Edition using Java 1.1, 3rd edition, 1997.*

Cramer et al, "Compiling Java Just in time", IEEE Micro, May 1997.*

David Flanagan, *JAVA In a Nutshell*, Chapter 3—Classes and Objects in Java, pp. 60–61, Second Edition, Copyright 1997, 1996 O'Reilly & Associates, Inc.

* cited by examiner

*Primary Examiner*—St. John Courtenay, III

(74) *Attorney, Agent, or Firm*—Winstead Sechrest & Minick P.C.; Jeffrey S. LaBaw

(57) ABSTRACT

A data processing system and method manage the storage of instructions used in applications developed using an interpretive programming language, such as Java, REXX, BASIC, and the like, when those instructions are compiled into byte-codes to be used by a virtual machine stored in a "heap." In the data processing system and method, an exception is registered in a page manager of an operating system to identify that compiled code should be stored within the heap of the virtual machine. After that code has been compiled and deleted from the heap, an exception occurs when the virtual machine attempts to subsequently access the compiled code. At that point, the virtual machine is then enabled to retrieve the desired code from an interpreted programming language application.

12 Claims, 6 Drawing Sheets

CLIENTS
WEB SITES 112
112
112
112
112
112
114
INTERNET
ACCESS
PROVIDER
116
ON-LINE
SERVICE
PROVIDER
110
110
110
110

-- PRIOR ART --

DATA PROCESSING SYSTEM AND METHOD FOR MANAGING MEMORY OF AN INTERPRETIVE SYSTEM

TECHNICAL FIELD

The present invention relates in general to data processing systems, and in particular, to the management of a memory of an interpretive system environment.

BACKGROUND INFORMATION

The worldwide network of computers, commonly known as the "Internet," has seen explosive growth in the last several years. This growth has been typically fueled by the introduction and widespread use of "web" browsers that allow for simple graphical user interface-based access to network servers. Such network servers typically support documents formatted as "web pages." The "World Wide Web" (www) is a collection of servers on the Internet that utilize the Hypertext Transfer Protocol (HTTP), a known application protocol that provides users access to files using a standard page description language referred to as Hypertext Markup Language (HTML). It should be noted that files may be provided in different formats such as text, graphics, images, sound, and video, among others. HTML provides basic document formatting and allows a developer to specify "links" to other servers and files. Use of an HTML-compliant client browser involves specification of a link via a Uniform Resource Locator, commonly known by the acronym, "URL." Upon specification of a URL, a client may make a TCP/IP (Transmission Control Protocol/Internet Protocol) request to the server identified in the link and receive a "web page" in return, where the "web page" is a document formatted according to HTML.

FIG. 1 illustrates a communication network based on a client-server model typically utilized in the Internet. Conceptually, the Internet comprises a large network of "sites" 110 that are accessible by "clients" 112. Each of the plurality of clients 112 is typically a user of a personal computer. Clients 112 access the Internet through some private Internet access provider 114 (such as Internet America™ or an on-line service provider 116 (such as America On-Line™, Prodigy, Microsoft Network™, and the like). Access provider 114 and service provider 116 will hereinafter be collectively referred to as the web servers. Furthermore, it should be noted that providers available on a web site are also known as web servers. Each of the clients 112 may run a "browser," which is a known software tool used to access the sites 110 via the web servers (114 and 116). Each site 110 selectively operates a "web site" that supports files in the form of documents and pages. A network path to a server is identified by a uniform resource locator (URL) having a known syntax for defining a network connection. As previously mentioned, URLs may be utilized to specify a link from the user to another server or file. Upon specification of a link, one of the clients 112 makes a TCP/IP request to one of the plurality of sites 110 identified in the link and receives a web page (specifically, a document formatted according to HTML) in return. It should be noted that in some instances, a Java application may be executed without the use of a browser. Specifically, an applet viewer that runs independently of a browser may allow a user to actually view applets and similar Java applications across the Internet without having to use a browser.

In such a communication system, Java is a programming language that is often used to program applications made available on the Internet because Java is very flexible and may be easily used on any operating system, as long as that system implements a Java virtual machine. During execution of a Java-based application, a Java program is compiled into an architecture-neutral byte format that allows the application to be executed on any system platform that also implements the Java virtual machine.

It should be noted that the flexibility and neutrality of Java applications results from Java's implementation as an "interpreted" language. In interpreted languages, a compiler typically generates byte-codes to be used by a programming virtual machine, rather than native machine code, to provide control and data necessary to execute an application. More specifically, in Java, a Java compiler typically generates byte-codes to be used by the Java Virtual Machine (JVM), rather than native machine code, to provide the control and data signals necessary to execute a Java application. Subsequently, to actually execute a Java application, a Java interpreter executes the compiled byte-codes generated by the Java compiler. As previously mentioned, Java applications may be executed on any platform that the A JVM has been ported to as such byte-codes are platform-independent. An advantage of the interpreted environment is that a standard "compile" phase of program development is significantly diminished when viewed in contrast with the compile-link-run cycles required by programming languages such as C and C++.

In contrast, a disadvantage of interpreted programming languages, such as Java, is that that programming language is not executed as quickly as a compiled language, such as the C programming language. To boost the performance of applications written in Java, many Java interpreters include "Just In Time" (JIT) compilers that are able to translate certain Java byte-code segments into machine code for a particular central processing unit at run-time. This block of compiled code (also referred to as JIT'ed code) is then stored in a storage space, referred to as a "heap."

By storing the JIT'ed code in a heap, the code may be repeatedly accessed and is not required to be compiled a second time. In current operating systems supporting Java, the heap is stored as part of the Java virtual machine. Therefore, heaps for storing the compiled code tend to grow larger until the memory space allocated for the heap is exceeded in current Java applications that implement JIT compilation. Upon exceeding the physical memory space, certain portions of the data stored within the heap are then transferred to a "paging file." The paging file is a paging space, or an area on a disk, which is used to store physical memory data pages that may not be stored within a current memory used by an operating system or application.

When the "paged" data is required again, the data is retrieved from the disk and used again. While this methodology allows for the compiled code to be retrieved and not recompiled, this paging process requires an excessive amount of time and does not allow the heap to become smaller than a predefined size. This requirement may then result in an efficient use of memory within a Java virtual machine supporting a Java application.

Therefore, a need exists for a method and apparatus for managing a heap in a Java virtual machine to ensure efficient and timely execution of applications implemented using the Java programming language.

SUMMARY OF THE INVENTION

The previously mentioned needs are fulfilled with the present invention. Accordingly, there is provided, in a first form, a data processing system for executing a software program. The data processing system includes a virtual machine for converting a first portion of the software program to a first plurality of data values. The software program is an interpreted language program. The data processing system also includes a memory. A first portion of the memory selectively stores the first plurality of data values. The data processing system also includes an operating system device for managing removal and replacement of the first plurality of data values from the memory. The operating system device is connected to the virtual machine and to the memory.

Additionally, there is provided, in a second form, a method for executing a software program in a data processing system. The method includes the steps of receiving a software program written in an interpreted programming language and initiating operation of a virtual machine to selectively convert at least a first portion of the software program to a first plurality of byte-code values. The method also includes the steps of selectively storing the first plurality of byte-code values in a first memory and selectively providing the first plurality of byte-code values to an operating system. As well, the method includes the steps of enabling the operating system to execute the software program and enabling the operating system to selectively remove the first plurality of byte-code values from the first memory.

Furthermore, there is provided, in a third form, a computer program in a computer readable medium. The computer program includes a device for receiving a software program written in an interpreted programming language and a virtual machine. Operation of the virtual machine is initiated to selectively convert at least a first portion of the software program to a first plurality of byte-code values. The computer program also includes a first memory for selectively storing the first plurality of byte-code values. As well, the computer program includes an operating system device for selectively receiving the first plurality of byte-code values, for selectively executing the software program, and for selectively discarding the first plurality of byte-code values from the first memory.

These and other features, and advantages, will be more clearly understood from the following detailed description taken in conjunction with the accompanying drawings. It is important to note the drawings are not intended to represent the only form of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
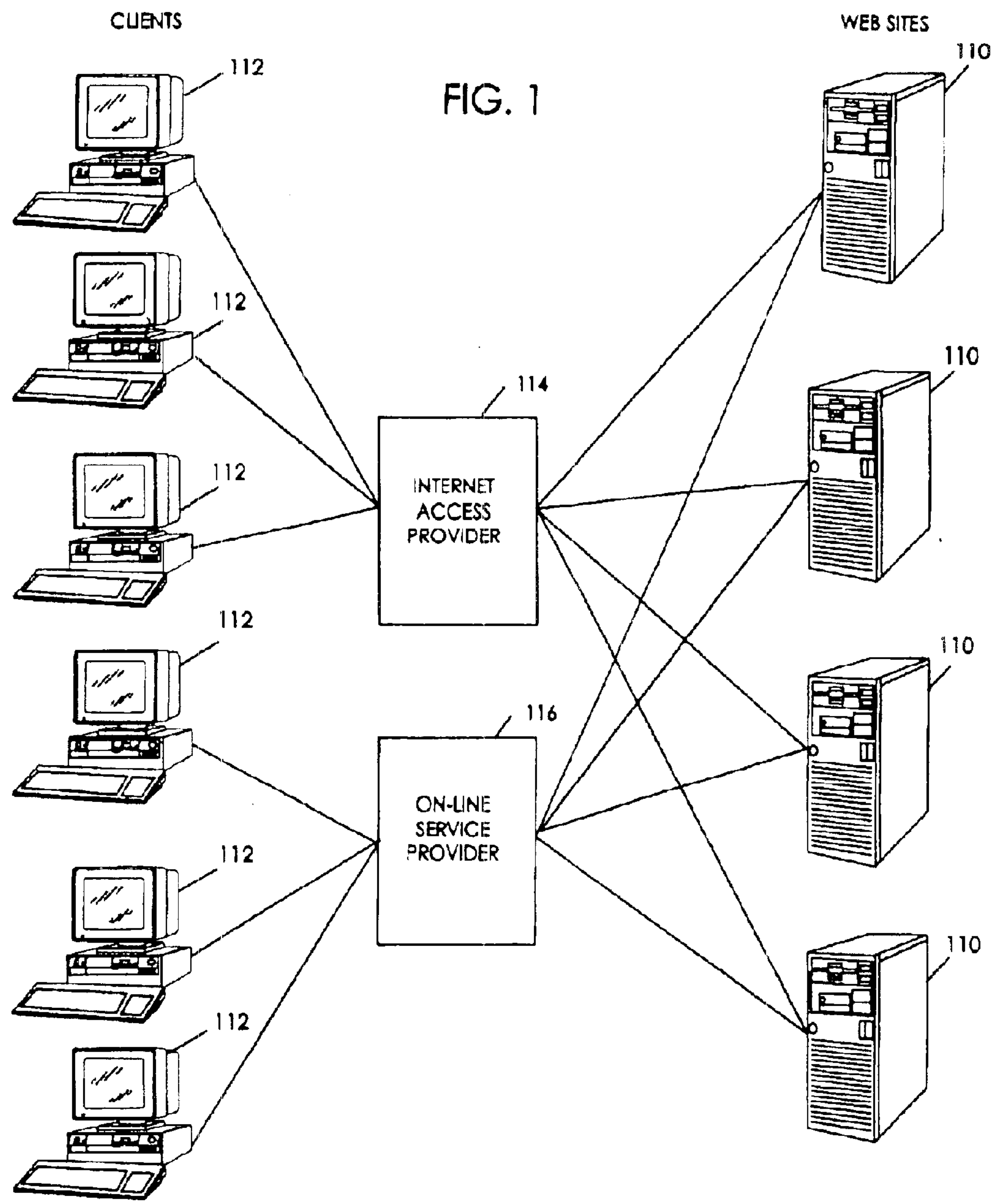
FIG. 1 illustrates, in block diagram form, a communication system implemented in accordance with one embodiment of the present invention.

The present invention implements a data processing system and method for managing the storage of instructions used in applications developed using an interpretive programming language, such as Java, REXX, BASIC, and the like, when those instructions are compiled into byte-codes to be used by a virtual machine and stored in a "heap." It should be noted that a "heap" refers to an area of memory in a virtual machine where the byte-codes utilized during execution of an application implemented using the interpretive programming language. The present invention recognizes that the heap continues to store more and more information until the application is finished executing and the heap is cleared. However, this may not be the most efficient use of the memory space associated with the heap. Therefore, the present invention proposes a method and data processing system that implement extensions in an operating system to manage the heap associated with the virtual machine. Thus, a page manager for managing physical memory pages associated with most operating systems, may be used to manage pages for the virtual machine. Implements and operation of the present invention will subsequently be described in greater detail. Prior to that description, however, an environment in which the present invention may be implemented will be provided in greater detail.

In the following description, numerous specific details are set forth to provide a thorough understanding of the present invention. However, it will be obvious to those skilled in the art that the present invention may be practiced without such specific details. In other instances, well-known devices have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Figure 2:
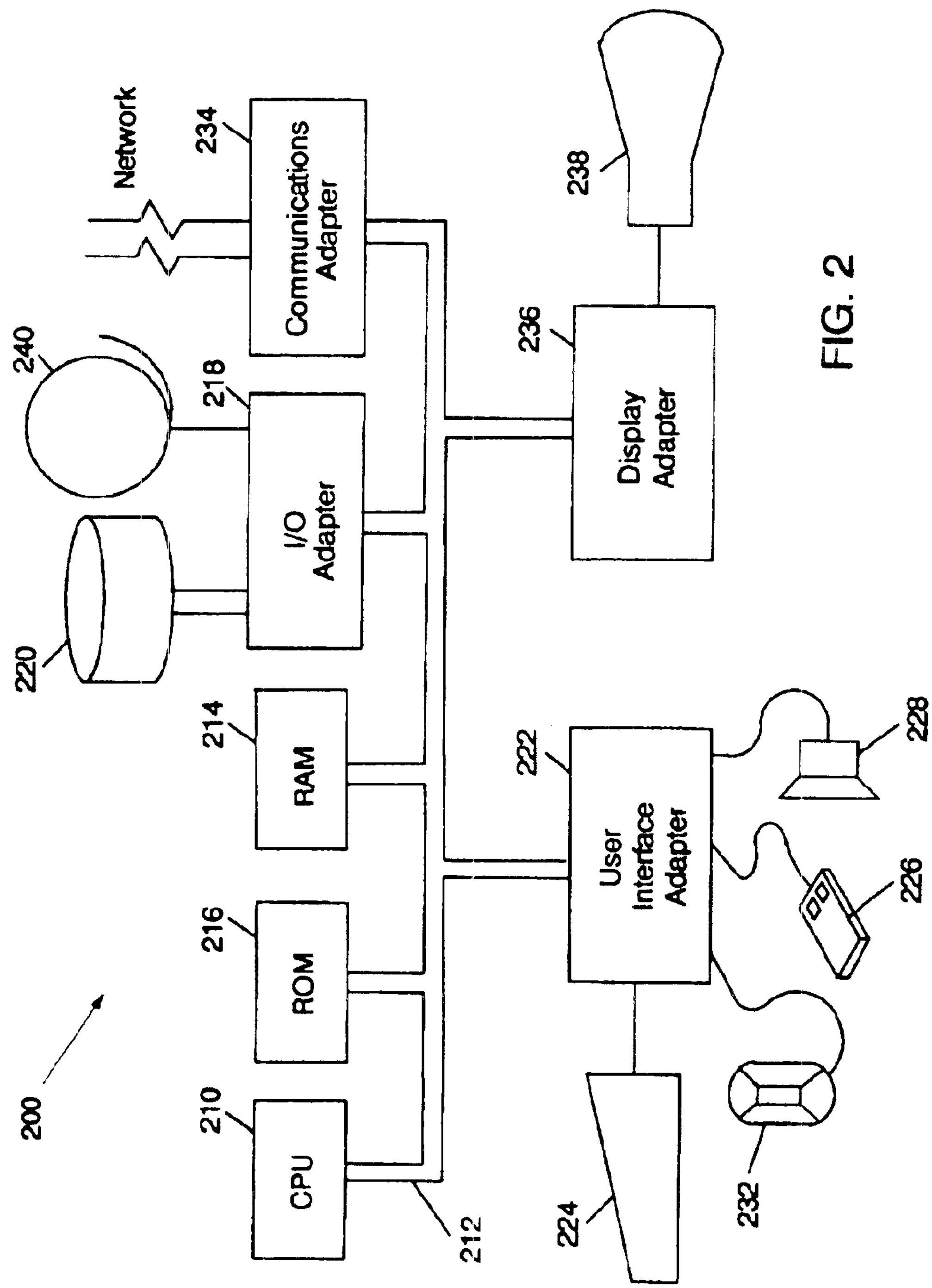
FIG. 2 illustrates, in block diagram form, a data processing system implemented in accordance with one embodiment of the present invention.

A general environment in which the communication network and methodology of the present invention may be implemented is illustrated in FIG. 1, which has been previously discussed. FIG. 2 illustrates a data processing system which may implement one embodiment of the present invention. It should be noted that the data processing system of the present invention may be utilized to implement a personal computer, a personal digital assistant (PDA), and a myriad of Internet devices (e.g., set top boxes, web television, etc.).

Referring first to FIG. 2, an example is shown of a data processing system 200 which may be used for the invention. The system has a central processing unit (CPU) 210, such as a PowerPC microprocessor ("PowerPC" is a trademark of IBM Corporation) according to "The PowerPC Architecture: A Specification for a New Family of RISC Processors", 2d Edition, 1994, Cathy May, et al. Ed., which is hereby incorporated herein by reference. A more specific implementation of a PowerPC microprocessor is described in the "PowerPC 604 RISC Microprocessor Users Manual", 1994, IBM Corporation, which is hereby incorporated herein by reference. The history buffer (not shown) of the present invention is included in CPU 210. The CPU 210 is coupled to various other components by system bus 212. Read only memory ("ROM") 216 is coupled to the system bus 212 and includes a basic input/output system ("BIOS") that controls certain basic functions of the data processing system 200. Random access memory ("RAM") 214, I/O adapter 218, and communications adapter 234 are also coupled to the system bus 212. I/O adapter 218 may be a small computer system interface ("SCSI") adapter that communicates with a disk storage device 220. Communications adapter 234 interconnects bus 212 with an outside network enabling the data processing system to communication with other such systems. Input/Output devices are also connected to system bus 212 via user interface adapter 222 and display adapter 236. Keyboard 224, track ball 232, mouse 226 and speaker 228 are all interconnected to bus 212 via user interface adapter 222. Display monitor 238 is connected to system bus 212 by display adapter 236. In this manner, a user is capable of inputting to the system throughout the keyboard 224, trackball 232 or mouse 226 and receiving output from the system via speaker 228 and display 238. Additionally, an operating system such as AIX ("AIX" is a trademark of the IBM Corporation) is used to coordinate the functions of the various components shown in FIG. 2.

Preferred implementations of the invention include implementations as a computer system programmed to execute the method or methods described herein, and as a computer program product. According to the computer system implementation, sets of instructions for executing the method or methods are resident in the random access memory 214 of one or more computer systems configured generally as described above. Until required by the computer system, the set of instructions may be stored as a computer program product in another computer memory, for example, in disk drive 220 (which may include a removable memory such as an optical disk or floppy disk for eventual use in the disk drive 220). Further, the computer program product can also be stored at another computer and transmitted in a computer readable medium when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change. While it is convenient to describe the invention in terms of instructions, symbols, characters, or the like, the reader should remember that all of these and similar terms should be associated with the appropriate physical elements.

Note that the invention describes terms such as comparing, validating, selecting or other terms that could be associated with a human operator. However, for at least a number of the operations described herein which form part of the present invention, no action by a human operator is desirable. The operations described are, in large part, machine operations processing electrical signals to generate other electrical signals.

Figure 3:
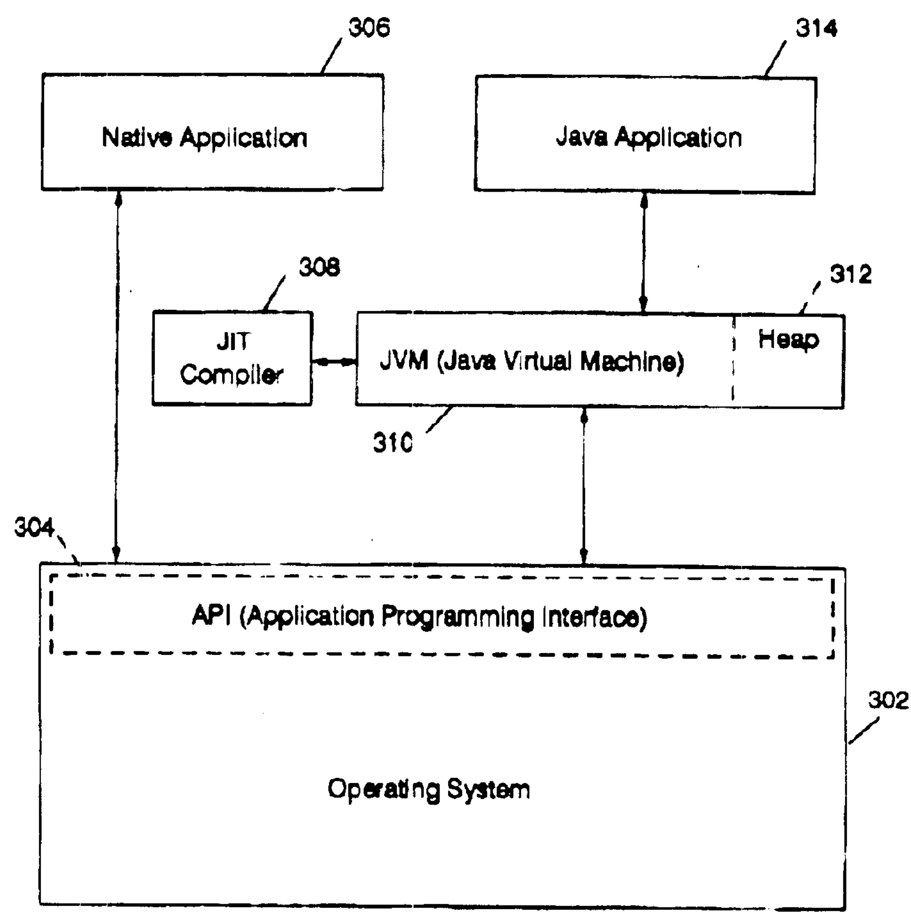
FIG. 3 illustrates, in block diagram form, an organizational view of a prior art operating environment.

FIG. 3 provides an organizational view of a prior art operating environment for an interpretive programming language. In an example illustrated in FIG. 3, the interpreted programming language is Java. However, it should be well understood to those skilled in the art that interpreted programming languages may be utilized such as REXX, BASIC, SmallTalk, Python, and the like. In this operating environment, operating system 302 is a virtual memory operating system that effectively manages memory required to execute applications therein As a virtual memory operating system, operating system 302 typically does not have sufficient memory to manage applications to be performed therein and, therefore, must store data on an external disk or memory, such as disk drive 220 or memory space 240. Subsequently, when operating system 302 again requires the data stored in the external memory, operating system 302 retrieves that data using well-known retrieval techniques.

To describe operation of the Java operating environment illustrated in FIG. 3, an example will be provided below. In this example, assume that Java Virtual Machine (JVM) 310 uses system services provided by operating system 302 to execute a function specified in a Java applet or application. A Java applet is actually a program written in the Java programming language that is typically linked to a web page. To call an applet or application, a Java programmer creates a file on a server in which the Java source code is stored. Upon creation of the file, an HTML page is created with a special tag to indicate that a browser (located on client 112) should download the file and interpret it as a Java applet or application. Assume that the Java applet or application requires that the browser within a client provide the appropriate data and control signals to draw a window on a display device (238 of FIG. 2). To provide those data and control signals, JVM 310 translates the Java program into byte-codes, also referred to as API (application programming interface) calls. JVM 310 provides the API calls to API 304. API 304 subsequently translates the calls to the appropriate control and data signals required to enable operating system 302 to provide the signals required by display adapter 236 and display device 238 of FIG. 2 to draw a window thereon.

In interpreted programming systems, JIT compiler 308 compiles portions of Java code that are repeatedly used by operating system 302. Thus, rather than merely compiling codes into a byte-code format that is subsequently compiled by JVM 310, JIT compiler 308 compiles Java program portions into native instructions utilized by the hardware platform upon which the operating system is implemented. When the code is compiled into actual native code, the native code may execute directly within operating system 302 and is not required to run through an interpreted programming device, such as JVM 310.

After Java programming code is compiled by either JVM 310 or JIT 308, the code is stored in "pages" in a heap 312 in JVM 310 or JIT compiler 308. During operation, a size of the heap grows as the number of pages and amount of data stored therein increases. When the application is subsequently terminated, the pages and data stored within the heap is cleared. However, heap 312 may need to be cleared or have selected portions therein deleted during execution of the application should more memory be required by the application. Alternatively, Java code that has been previously compiled may be utilized by subsequently executing applications and, therefore, may be required even after the heap is cleared. To address these issues, the present invention proposes that the heap, whether in JVM 310 or JIT compiler 308, should be managed by a page manager within operating system 302.

Typically, operating systems, such as operating system 302, implement page managers that determine an amount of memory utilized during execution of an application therein. Furthermore, in prior art implementations, Java applications are typically managed by JVM 310 and JVM 310 is managed by operating system 302. In prior art implementations such as that illustrated in FIG. 3, Java applets or applications are managed by JVM 310. Thus, in the course of execution of the Java applet or application, JVM 310 may determine that heap 312 is becoming too full. At that point, operating system 302 will swap memory from a portion of JVM 310 heap 312) to an external memory (not illustrated herein). The external memory may be a disk that stores a plurality of paging files.

In contrast, the present invention proposes that the heap managed by JVM 310 will be managed by a page manager within operating system 302. Typically, such a page manager manages physical memory pages within a data processing system. Physical memory pages are representative of the "real" memory found in a data processing system (e.g., RAM). The physical memory pages are aliased by the virtual pages to allow for more addressability than an amount of RAM physically located in the data processing system. The use of virtual memory to support an operating system having a memory model that requires more memory than that physically addressed on an implementing system is well-known to those with skill in the data processing art.

FIG. 3 illustrates a prior art implementation of a Java operating environment. In this prior art operating environment, native applications (306) call APIs directly in API 304 and operating system 302. In contrast, in such prior art implementations, a Java application 314 must call a Java class or a "AWT" (Advanced Windowing Toolkit) to perform certain functions in JVM 310. JVM then translates those calls to byte-code information or provides the Java instructions to JIT compiler 308 where they are compiled into native code. JVM 310 subsequently communicates the data and control signals to API 304 and operating system 302. Thus, in prior art implementations, JVM 310 is an application of operating system 302. Therefore, each time a Java application is initiated, JVM 310 must also be launched to communicate to operating system 302 and perform translations of the Java application.

Thus, by using a methodology that treats Java applets or applications in a same manner as any other application within operating system 302, the page manager of the operating system may be used to monitor and control use of memory within operating system 302 in a timely and efficient manner. Thus, the same page manager with the same operating algorithm may be used to monitor and control use of memory during interpretation and execution of a Java applet or application. If such an implementation were not available, the prior art techniques would either not provide such a monitoring and control function, or would be required to implement a separate page manager for controlling the memory associated with Java applets and applications. Such an added page manager would result in increased overhead associated with a communication system in which it was implemented. For instance, in one embodiment of the present invention, should operating system 302 require more memory to execute a Java applet or application, the page manager could be used to automatically discard the pages out of the heap (312) to allow other applications to execute efficiently within the operating system. It should be noted that the operating system will utilize a page manager algorithm to determine the pages to be discarded in one embodiment of the present invention. Typically, the page management algorithm is a "least used" algorithm that clears memory that has not been used in a longest amount of time.

Thus, in one embodiment of the present invention, a heap management system is implemented to take advantage of the functionality of an operating system (302) and does not require overhead associated with typical swapping routines implemented by JVMs in the previously described prior art implementations of Java operating environments. A more detailed description of a methodology executed in accordance with the present invention will be described in greater detail in FIG. 4. It should be noted that the following discussion of FIG. 4 will reference elements identified in the organizational overview of the present invention illustrated in FIG. 5.

Figure 4:
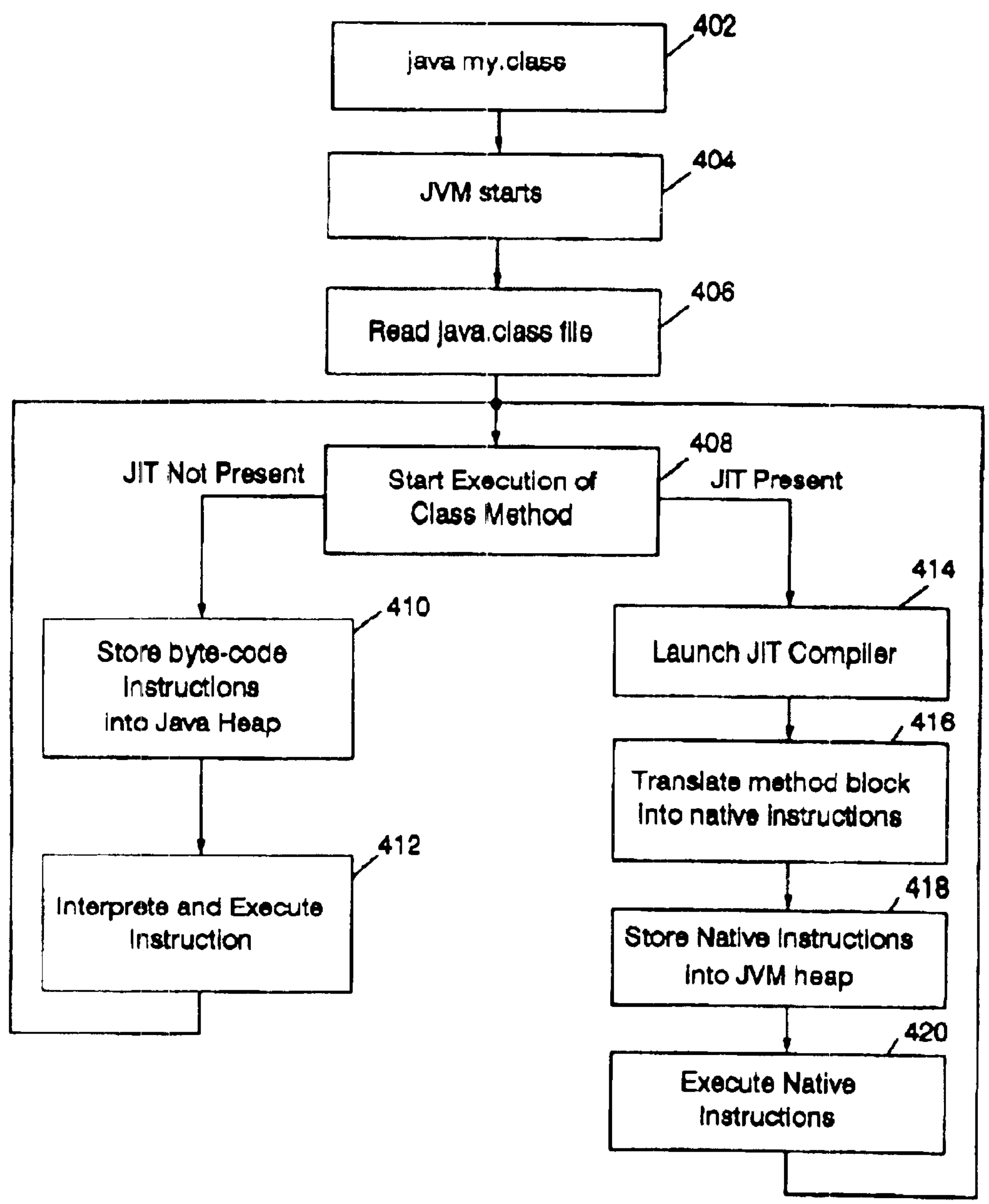
FIG. 4 illustrates, in flowchart form, an execution flow in accordance with one embodiment of the present invention.

Refer now to step 402 of FIG. 4. In step 402, a data processing system, such as a browser of a client (112), calls a Java application through well-known methods. When the Java application is called, operation of JVM 310 is launched in step 404. Subsequently, Java application 314 provides a "java my.class" command to JVM 310. In response to this command, JVM 310 then reads in Java class files required to execute the Java application in a step 406.

Once JVM reads in the required Java class files, JVM 310 begins execution of class methods in a step 408. In Java it should be noted that the term "method" is an object-oriented term for a procedure or function. Furthermore, it should be noted that every method in Java resides in a class file and may be declared as static or instant. During execution of the class methods, JVM 310 receives environment variables that indicate whether a JIT compiler is enabled. It should be noted that in current Java implementations, the JIT compiler is enabled by default. A user may disable a JIT compiler in a number of different ways. Specifically, the user may use a command line option or a command to modify the command shell of the environment to effectively disable the JIT compiler. To disable the JIT compiler upon launching the Java application, the user could insert the following code:

Java -DJava.compiler=xyz hello.

It should be noted that other options are also available to disable and enable the JIT compiler.

During execution of the class methods in step 408, JVM 310 determines whether or not code previously compiled by JIT compiler 308 is present. If JVM 310 determines that the code being presented to operating system 302 does not include JIT compiled code, the byte-code instructions compiled by JVM 310 are stored in Java heap 312 in a step 410. Subsequently, JVM 310 interprets and executes the byte-code instructions stored in heap 312 for a class of instructions that have been called and should be executed by operating system 302. A program flow then returns to step 408 to obtain additional instructions to be executed. In an alternative system, should JVM 310 determine that JIT compiled code is present in the software provided by Java application 314, JIT compiler 308 is launched in a step 314. JIT compiler 308 subsequently interprets a block of instructions and converts them directly into native instructions for execution on operating system 302. JIT compiler 308 is enabled to compile a block of instructions by a predetermined block code provided from Java application 314 to JVM 310. Upon receipt of this preselected byte code, JVM 310 provides the appropriate control and data information to JIT compiler 308 to enable JIT compiler 308 to compile the byte-code instructions for a certain number of instructions. After JIT compiler 308 has converted the byte-code instructions into native code, the native instructions are stored in heap 312. Thus, executable code is being stored in heap 312. Subsequently, JVM 312 provides the native instructions from the heap to operating system 302 where they are executed in accordance with a step 420. A program flow subsequently returns to step 408.

Figure 5:
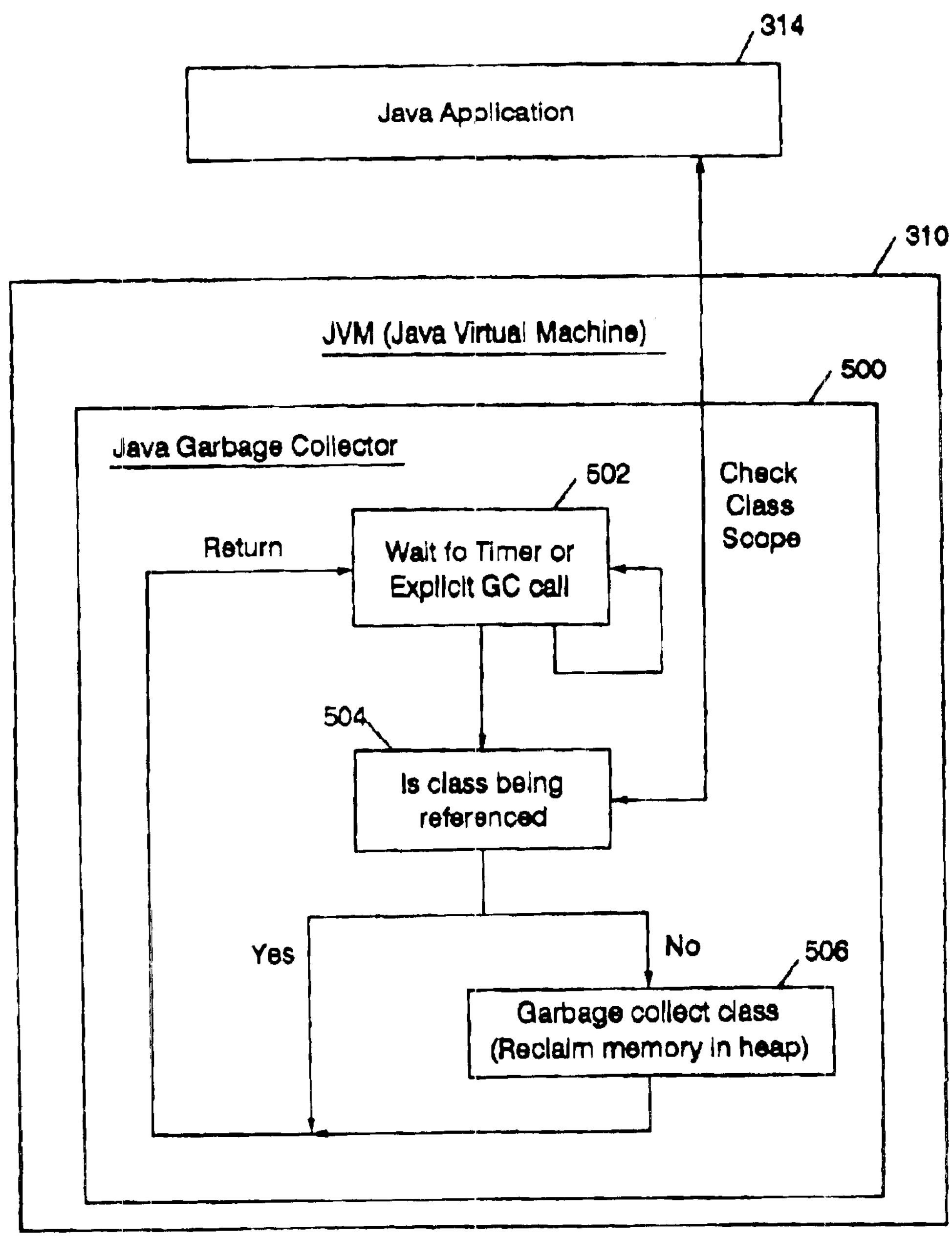
FIG. 5 illustrates, in block diagram form, a garbage collection mechanism and methodology implemented in accordance with one embodiment of the present invention.

As data, whether byte-code instructions or native instructions, are stored in heap 312, a method and processing system for efficiently utilizing heap 312 resources is implemented by the present invention. The present invention utilizes a function referred to as Java garbage collector 500 (as illustrated in FIG. 5). Generally, the Java garbage collector (500) runs as a low-priority thread and performs most of its operations when the system is relatively idle. For example, Java garbage collector 500 may run during idle time while waiting or user input in the form of keystrokes or mouse events. It should be noted, however, that in certain high-priority situations, the garbage collector may run while other operations are being executed. Such high-priority situations occur when there is no longer enough memory space.

Thus, during operation, Java garbage collector 500 either waits for a timer call or an explicit garbage collector call (502). Upon receipt of the timer call or the explicit garbage collector call, JVM 310 determines a class that is being referenced in Java application 314. JVM 310 is therefore able to check a scope of the class being referenced in Java application 314. Stated another way, JVM 310 is determining whether there is an outstanding pointer to the object being executed in Java application 314. If the class is being referenced when Java garbage collector 500 is operating, the memory associated with that class is being used and, therefore, should not be removed from heap 312. Subsequently, Java garbage collector 500 waits for another timer or an explicit garbage collection call. In the alternative, if the class is not being referenced by Java application 314, Java garbage collector 500 is enabled to collect the class from heap 312 and release memory occupied in the heap for future use.

To determine the class being referenced and to be collected, several implementations may be utilized. For instance, a single class may be identified and then referenced accordingly. More commonly, Java garbage collector 500 may enable JVM 310 to scan through all of the classes utilized by Java application 314 to determine which classes are available and which are not. If all classes are currently being referenced by Java application 314, then Java garbage collector 500 remains in a waiting state. However, if one of the classes is not being referenced, garbage collector 500 is enabled to garbage collect the unused class. Basically, Java garbage collector 500 may be implemented as a collector that scans a dynamic memory area used by the Java application for objects and marks both objects that are referenced. After all possible paths to objects are investigated, those objects that are not marked are known to be garbage and are collected.

Figure 6:
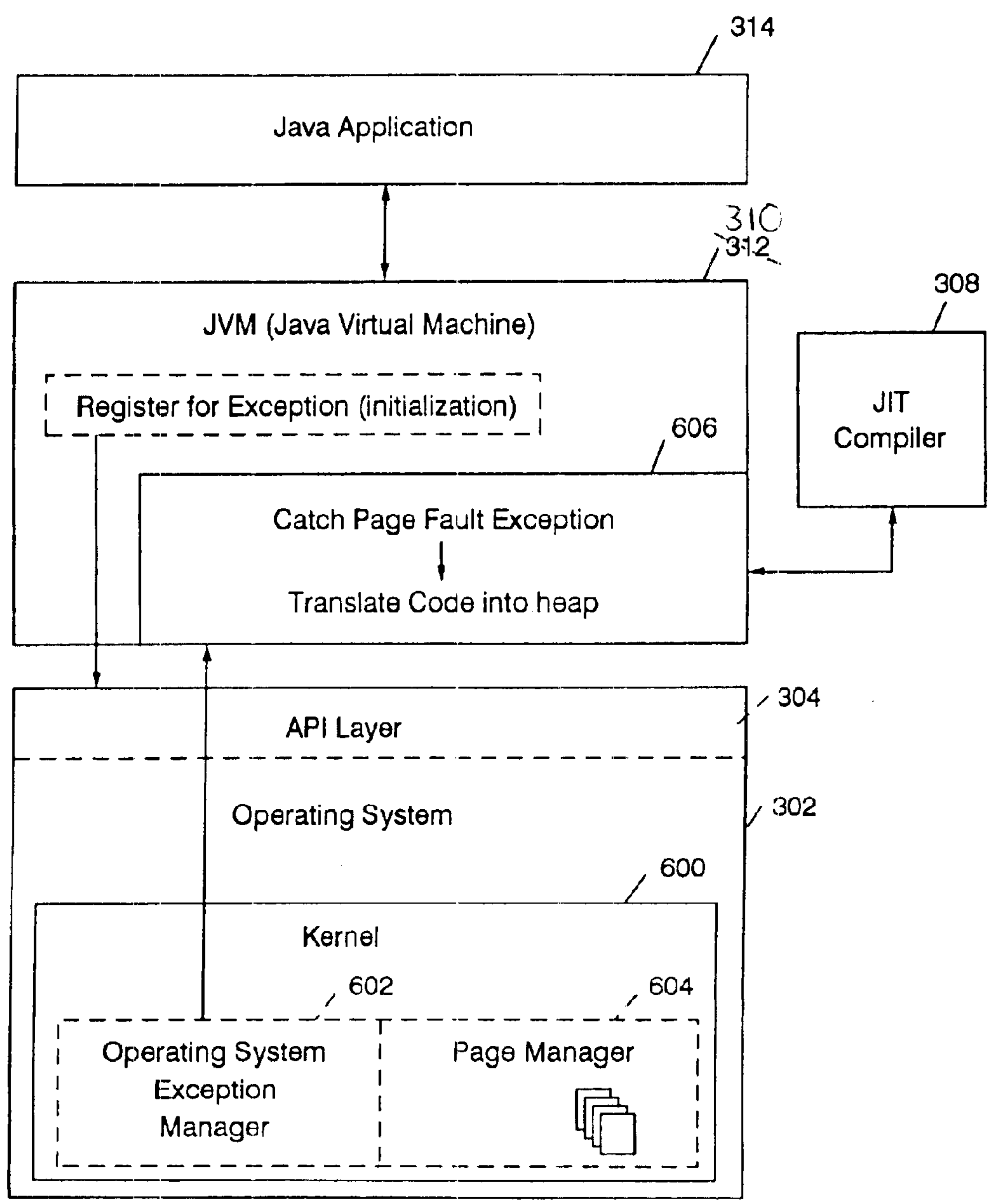
FIG. 6 illustrates, in block diagram form, an overview of operation of one embodiment of the present invention.

Refer now to FIG. 6 for an organizational overview of the operation executed by the present invention. As illustrated in FIG. 6, Java application 314 is executing and launches JVM 310. When JVM 310 is launched, it registers for an exception during an initialization process. JVM 310 also reserves a range of memory that JVM 310 will use during its occupation of the class being loaded. This allocation may be performed dynamically. Furthermore, as previously described, JVM 310 registers for a page fault exception to operating system 302. JVM 310 would call a registration API in operating system 302 for invalid access exception (e.g. page fault exception). Depending on an exception manager in the operating system, the registration is performed on a per thread basis or a per process basis. When JVM is registering the exception during initialization, JVM 310 issues a class to API layer 304. JVM 310 also reserves a range of write-execute system level memory through an API call for the occupation of the byte-code of the executing Java application. It should be noted that the memory is reserved, but not mapped. The memory will actually be mapped upon an invalid exception occurrence.

As Java application 314 is executing, class files are called by JVM 310. Each of class files is processed directly as byte-code instructions or converted to native instructions (using JIT compiler 308) and stored in heap 312. As heap 312 becomes full or should operating system 302 require additional memory space for execution of application 314, code is cleared from heap 312. Subsequently, when Java application 314 reaccesses a memory location associated with compiled code and that compiled code has been cleared from heap 312, kernel 600 identifies that the heap memory is no longer valid. Page manager 604 within kernel 600 determines that the accessed data is no longer stored within heap 312 and generates an Invalid Access exception (not illustrated herein). The Invalid Access exception is communicated to operating system exception manager 602. Operating system exception manager 602 subsequently communicates the call to exception handling routine 606 of JVM 312. Within exception handling routine 606, control and data signals are generated to access the missing code from the Java application. Furthermore, exception handling routine 606 enables JIT compiler 308 to compile the code, where necessary. Exception handling routine 606 then stores the code in heap 312. Subsequently, exception handling routine 606 sends a message to kernel 600 to indicate that kernel 600 should resume execution. Such a resume execution message is then transmitted to page manager 604 such that it continues executing properly. The code may be translated into either byte-code instructions or passed to JIT compiler 308 where it is converted to native instructions, in accordance with specifications of Java application 314.

Furthermore, as illustrated in FIG. 6, page manager 604 provides the appropriate control for deleting information from heap 312. Page manager 604 utilizes algorithmic or heuristic methodologies to determine when data should no longer be stored on heap 312.

It should be noted that the description provided herein is but one example of an implementation of the present invention. It should be noted that many additional implementations may also be utilized to realize the present invention. For example, while the present invention has been explained in the context of the Internet, it should be noted that the present invention may be implemented on a complete stand-alone system that is executing a Java application. Stated another way, there is no requirement that the present invention be utilized only within the context of the Internet, as it may just as easily be used by a single stand-alone data processing system executing Java applications.

While there have been described herein the principles of the invention, it is to be clearly understood to those skilled in the art that this description is made by way of example only and not as a limitation to the scope of the invention. Accordingly, it is intended, by the appended claims, to cover all modifications of the invention which fall within the true spirit and scope of the invention.

What is claimed is:

1. A method for managing a memory in a virtual machine comprising the steps of:

receiving a software program written in an interpreted programming language;

initiating operation of said virtual machine to selectively convert at least a portion of said software program to a plurality of byte-code values;

selectively storing said plurality of byte-code values in said memory;

enabling a page manager to selectively enable said memory to discard said plurality of byte-code values; and enabling an application programming interface to perform a registration operation when said software program is initialized;

wherein said registration operation indicates a portion of said memory is to be reserved for use by said virtual machine during execution of said software program.

2. The method as recited in claim 1 further comprising the step of:

detecting when said virtual machine accesses said portion of said memory after said plurality of byte-code values is discarded.

3. The method as recited in claim 2, wherein if said virtual machine accesses said portion of said memory after said plurality of byte-code values is discarded then the method further comprises the step of:

providing an exception signal to indicate that said plurality of byte-code values have been discarded.

4. The method as recited in claim 3 further comprising the step of:

enabling said virtual machine to retrieve said portion of said software program in response to said exception signal.

5. A computer program product having a computer readable medium having computer program logic recorded thereon for managing a memory in a virtual machine, comprising:

programming operable for receiving a software program written in an interpreted programming language;

programming operable for initiating operation of said virtual machine to selectively convert at least a portion of said software program to a plurality of byte-code values;

programming operable for selectively storing said plurality of byte-code values in said memory;

programming operable for enabling a page manager to selectively enable said memory to discard said plurality of bate-code values; and programming operable for enabling an application programming interface to perform a registration operation when said software program is initialized;

wherein said registration operation indicates a portion of said memory is to be reserved for use by said virtual machine during execution of said software program.

6. The computer program product as recited in claim 5 further comprises:

programming operable for detecting when said virtual machine accesses said portion of said memory after said plurality of byte-code values is discarded.

7. The computer program product as recited in claim 6, wherein if said virtual machine accesses said portion of said memory after said plurality of byte-code values is discarded then the computer program product further comprises:

programming operable for providing an exception signal to indicate that said plurality of byte-code values have been discarded.

8. The computer program product as recited in claim 7 further comprises:

programming operable for enabling said virtual machine to retrieve said portion of said software program in response to said exception signal.

9. A system, comprising:

a virtual machine configured to selectively convert at least a portion of a software program to a plurality of data values, wherein said software program is written in an interpreted programming language;

a memory wherein said plurality of data values are selectively stored in said memory;

a page manager coupled to said virtual machine and said memory, wherein said Rage manager is configured to selectively enable said memory to discard said plurality of data values; and an application programming interface coupled to said virtual machine, wherein said virtual machine performs a registration operation to said application programming interface when said software program is initialized;

wherein said registration operation indicates a portion of said memory is to be reserved for use by said virtual memory during execution of said software program.

10. The system as recited in claim 9, wherein said page manager detects when said virtual machine accesses said portion of said memory after said plurality of data values is discarded.

11. The system as recited in claim 10, wherein if said virtual machine accesses said portion of said memory after said plurality of data values is discarded then said page manager generates an exception signal to indicate that said plurality of data values have been discarded.

12. The system as recited in claim 11, wherein said virtual machine is configured to retrieve said portion of said software program in response to said exception signal.

* * * * *